United States Patent
Smith et al.

(10) Patent No.: US 11,042,168 B2
(45) Date of Patent: Jun. 22, 2021

(54) DRONE SOURCED CONTENT AUTHORING USING SWARM ATTESTATION

(71) Applicant: INTEL CORPORATION, Santa Clara, CA (US)

(72) Inventors: Ned M. Smith, Beaverton, OR (US); Rajesh Poornachandran, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 115 days.

(21) Appl. No.: 16/296,762

(22) Filed: Mar. 8, 2019

(65) Prior Publication Data

US 2019/0302807 A1 Oct. 3, 2019

Related U.S. Application Data

(63) Continuation of application No. 15/979,133, filed on May 14, 2018, now Pat. No. 10,663,980, which is a
(Continued)

(51) Int. Cl.
| | |
|---|---|
| G05D 1/10 | (2006.01) |
| H04W 4/40 | (2018.01) |
| H04W 4/44 | (2018.01) |
| H04W 4/38 | (2018.01) |
| H04W 12/10 | (2021.01) |
| G01S 5/00 | (2006.01) |
| G06Q 20/12 | (2012.01) |
| B64C 39/02 | (2006.01) |

(Continued)

(52) U.S. Cl.
CPC .......... *G05D 1/104* (2013.01); *B64C 39/024* (2013.01); *G01S 5/00* (2013.01); *G06Q 20/123* (2013.01); *H04W 4/38* (2018.02); *H04W 4/40* (2018.02); *H04W 4/44* (2018.02); *H04W 12/108* (2021.01); *B64C 2201/123* (2013.01); *B64C 2201/143* (2013.01); *G08G 5/0034* (2013.01); *G08G 5/0069* (2013.01)

(58) Field of Classification Search
CPC .... G05D 1/104; H04W 12/1008; H04W 4/40; H04W 4/44; H04W 4/38; H04W 12/1202; H04W 12/10; G01S 5/00; G06Q 20/123; B64C 2201/123; B64C 2201/143; G08G 5/0069; G08G 5/0034
See application file for complete search history.

(56) References Cited

U.S. PATENT DOCUMENTS

| | | | |
|---|---|---|---|
| 2009/0157233 A1* | 6/2009 | Kokkeby | G01S 3/7864 701/3 |
| 2012/0059826 A1* | 3/2012 | Mate | G06F 16/739 707/737 |

FOREIGN PATENT DOCUMENTS

| | | |
|---|---|---|
| CN | 101039321 A | 9/2007 |
| CN | 102520729 A | 6/2012 |

(Continued)

*Primary Examiner* — Anne Marie Antonucci
(74) *Attorney, Agent, or Firm* — Kacvinsky Daisak Bluni, PLLC

(57) ABSTRACT

Various embodiments are generally directed to providing information capture by multiple drones, which may operate in a swarm, while maintaining rights and/or value assigned to the content authored by each drone or by subsets of drones. In general, the present disclosure provides that drones participating in content acquisition may attest to their authenticity to establish trust between drones in the swarm.

24 Claims, 10 Drawing Sheets

Related U.S. Application Data continuation of application No. 14/863,918, filed on Sep. 24, 2015, now Pat. No. 9,971,355.

(51) Int. Cl.
*H04W 12/108* (2021.01)
*G08G 5/00* (2006.01)

(56) References Cited

FOREIGN PATENT DOCUMENTS

| | | | |
|---|---|---|---|
| CN | 102768518 | A | 11/2012 |
| CN | 103194684 | A | 7/2013 |
| CN | 103941747 | A | 7/2014 |
| CN | 104298248 | A | 1/2015 |
| CN | 104486597 | A | 4/2015 |
| CN | 104902234 | A | 9/2015 |

\* cited by examiner

DRONE SOURCED CONTENT AUTHORING USING SWARM ATTESTATION

CROSS-REFERENCE TO RELATED APPLICATION

This application is a continuation of, claims the benefit of and priority to, previously filed U.S. patent application Ser. No. 15/979,133 filed on May 14, 2018, which is a continuation of, claims the benefit of and priority to, previously filed U.S. patent application Ser. No. 14/863,918 filed on Sep. 24, 2015, the subject matter of which is incorporated herein by reference in its entirety.

This application relates to International Patent Application No. PCT/US16/53833 entitled "DRONE SOURCED CONTENT AUTHORING USING SWARM ATTESTATION," filed Sep. 26, 2016. The contents of the aforementioned application are incorporated herein by reference.

TECHNICAL FIELD

Embodiments described herein generally relate to drones and particularly to swarms of drones capturing content.

BACKGROUND

Increasingly, drones are used to capture information. For example, information capture devices (e.g., video, audio, etc.) may be mounted to a drone to capture information. Furthermore, multiple drones may be deployed to crowd source the capturing of information. In particular, multiple drones may be deployed in a swarm or group to capture information.

With multiple drones participating in information capture, there may be some overlap in the samples captured. As such, overlapping data may be factored into a single copy. However, preserving the rights and assigning value to the captured information can be difficult where the samples overlap. Complicating this, drones may be operated by more than one entity. As such, overlapping data may dilute the rights of, and/or value assigned to, each entity.

DETAILED DESCRIPTION

Figure 1:
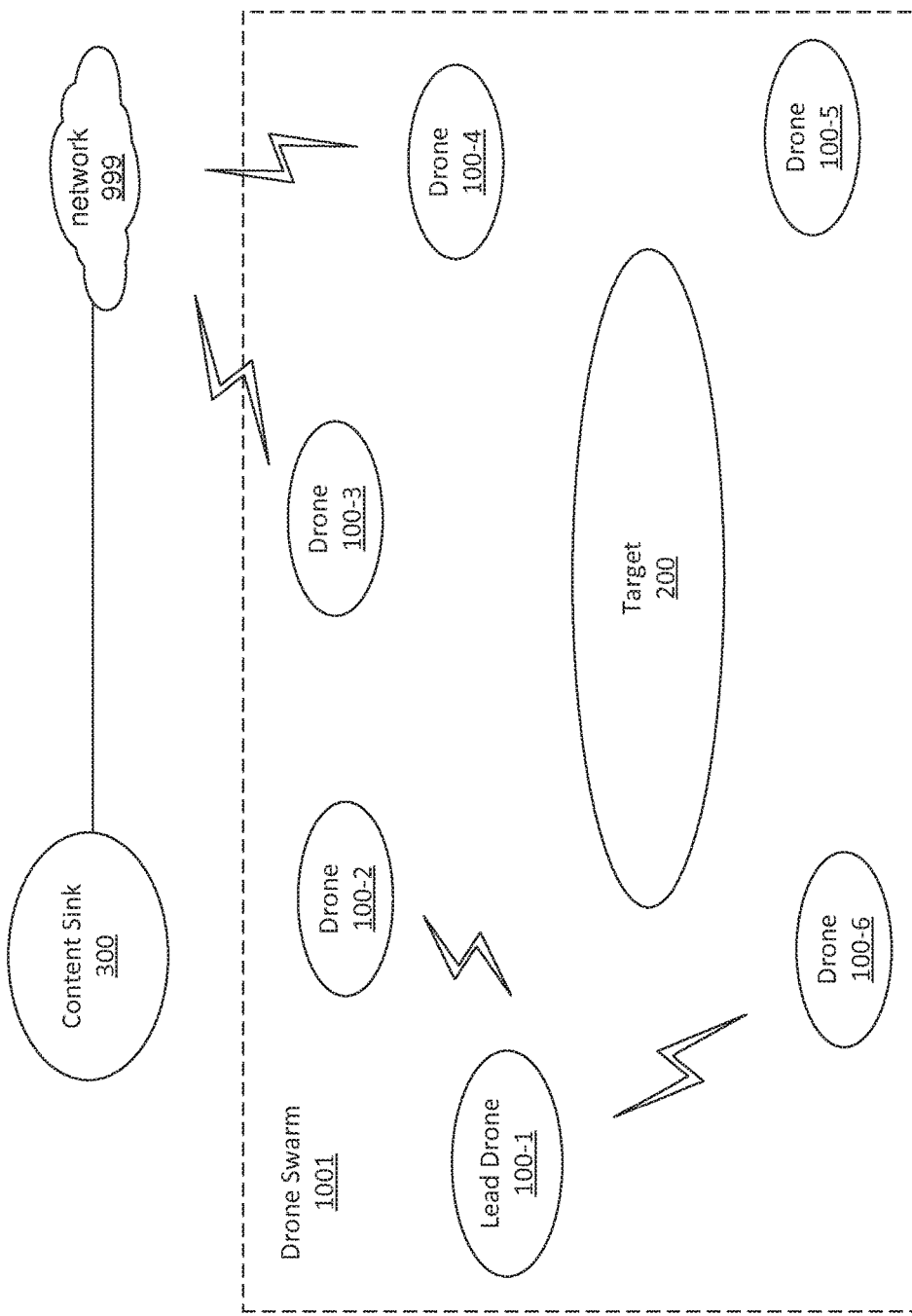
FIG. 1 illustrates a block diagram of a system according to an embodiment.

Various embodiments are generally directed to providing information capture by multiple drones, which may operate in a swarm, while maintaining rights and/or value assigned to the content authored by each drone or by subsets of drones. In general, the present disclosure provides that drones participating in content acquisition may attest to their authenticity to establish trust between drones in the swarm. With some examples, attestation may be facilitated by one time programmable fuses, unclonable fuses, or the like. Furthermore, positional information (e.g., a 3-dimensional (3D) positional relationship between the drone and a target, a 3D positional relationship between the drone and other drones in the swarm, etc.) may be recorded. Captured information may be encrypted and communicated to a content sink device (e.g., a designated drone, a cloud service, etc.). The content sink device may aggregate the content and create a history of the content acquisition (e.g., based on the 3D positional relationships, etc.) to assign value and rights to particular content acquiring drones or to one or more entities operating the drones.

With general reference to notations and nomenclature used herein, portions of the detailed description that follow may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may incorporate a general computing device. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

FIG. 1 depicts a block diagram of a drone sourced content authoring system 1000. The system 1000 may include a number of drones 100-a, where "a" is a positive integer. It is noted, that drones 100-1 to 100-6 are illustrated in this figure for purposes of explanation. However, the system 1000 may be implemented with any number of drones 100-a. As such, the examples herein are not to be limiting in this context. The drones 100-a may be any of a variety of types of drone devices. The drones 100-a may be autonomously controlled, operator controlled, a combination of autonomous and operator controlled. The drones 100-a may include or be operably coupled to information capture devices. For example, the drones 100-a may include various input capture devices, such as, a microphone, a camera, an infrared detector, or the like.

The drones 100-a may be configured to capture information related to a target 200. In general, the target 200 may be any object or location to which the drones are tasked with capturing information. For example, the target 200 may be a person or a group of people, a vehicle or a group of vehicles, a place, a geographic region, an event, or the like. In general, the drones 100-a may be configured to capture information (e.g., images, videos, audio, thermal imaging, or the like) related to the target 200. As a specific example, the target 200 may be a sporting event and the drones may be configured to capture video content related to the sporting event (e.g., content related to the participants in the event, the audience of the event, etc.).

As noted, the drones 100-a may be configured to operate in a swam 1001. Said differently, the drones 100-a may be configured to coordinate their operation and/or capture of information related to the target 200. Accordingly, the drones 100-a may be communicatively coupled to each other via one or more wireless communication standards and/or channels. For example, the drones 100-a may communicate via Bluetooth, WiFi Direct, ZigBee, or the like. It is noted, that only a few of the drones 100-a are depicted as wirelessly coupled in this figure for purposes of clarity. However, during operation, any number or combination of the drones 100-a may be communicatively coupled. In some examples, the communication may be based on various security protocols. For example, the drones 100-a may be configured to attest to each other to establish trust. A drone 100-a may limit the communication to another of the drones 100-a based on the success or failure the attestation process.

Furthermore, the drones 100-a may be configured to establish a lead drone. The drone 100-1 is depicted as the lead drone. However, in practice any one of the drones 100-a may be selected as the lead drone. Additionally, during operation, the designation of the lead drone may be dynamic. For example, the drone 100-1 may be initially designated as the lead drone and then the drone 100-3 (or another of the drones) may be designated as the lead drone. With some examples, the drone 100-a with the largest amount of residual energy (e.g., largest battery store, longest predicted runtime, or the like) may be designated as the lead drone. As another example, the drone 100-a with the largest amount of computing resources may be designated as the lead drone.

In general, the lead drone 100-a may be configured to coordinate the capture of information related to the target 200 between the drones 100-a. In some examples, the lead drone 100-a may be configured to send signals to the other drones to include an indication of an aspect of the target to capture. Continuing the example above where the target 200 is a sporting event, the lead drone 100-1 may be configured to send a signal to one of the other drones (e.g., the drone 100-2, or the like) to include an indication to capture information related to a particular portion of the sporting event (e.g., a portion of a playing field, or the like). Additionally, the lead drone 100-1 may be configured to send a signal to another one of the drones (e.g., the drone 100-3, or the like) to include an indication to capture information related to another portion of the sporting event (e.g., another portion of the playing field, a portion of the audience, or the like).

The lead drone 100-1 may be configured to receive signals from each of the drones to include an indication of a position of the drone in relation to the target 200. For example, the lead drone 100-1 may receive signals (e.g., wireless signals, or the like) from the drone 100-6 to include an indication of the 3D positional relationship of the drone 100-6 to the target 200 and/or other drones 100-a. The lead drone 100-1 may coordinate the capture of information related to the target 200 based on the positional information received from the drones 100-a.

The drones 100-a may be communicatively coupled via a network 999 to a content sink 300. In general, the content sink 300 may receive captured content from the drones 100-a (e.g., via network 999, or the like) and recorded positional information. The content sink 300 may aggregate the captured content into a single stream and may generate a history of the content capture based on the recorded positional information. Additionally, the content sink 300 may attribute rights and/or value to the aggregated content to the drones 100-a based on the recorded positional information. For example, a single content stream (e.g., having multiple perspectives) may be generated from the captured content and the contribution to the single stream or to parts of the stream may be determined for each drone based on the generated history of content capture.

With some examples, each of the drones 100-a send signals to the lead drone 100-1 to include indications of captured content and metadata (described in greater detail below) associated with the captured content and the lead drone 100-1 sends signals to the content sink 300 to include indications of the content captured by each of the drones 100-a and associated metadata.

Figure 2:
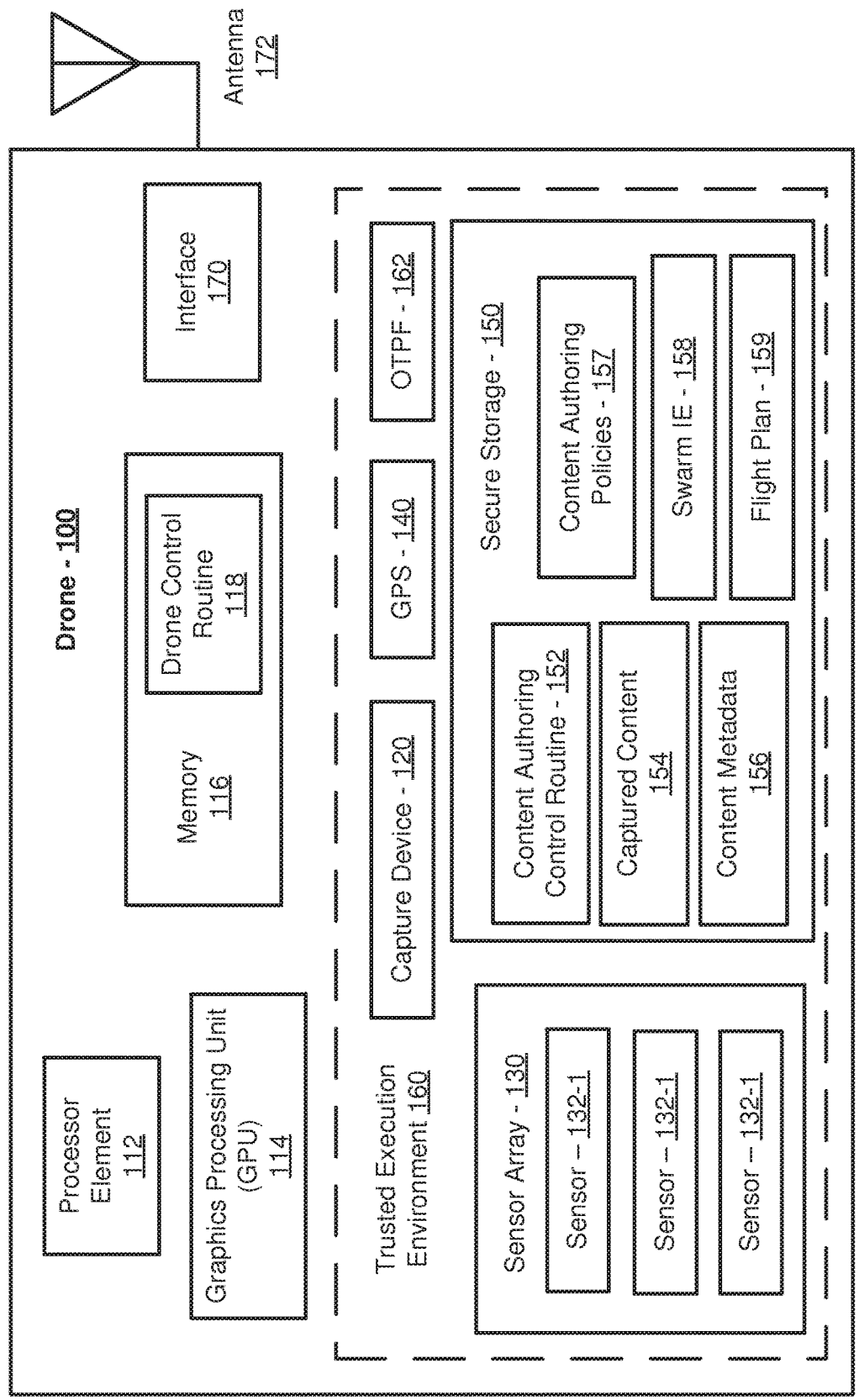
FIG. 2 illustrates a block diagram of a device of the system of FIG. 1 according to an embodiment.
Figure 3:
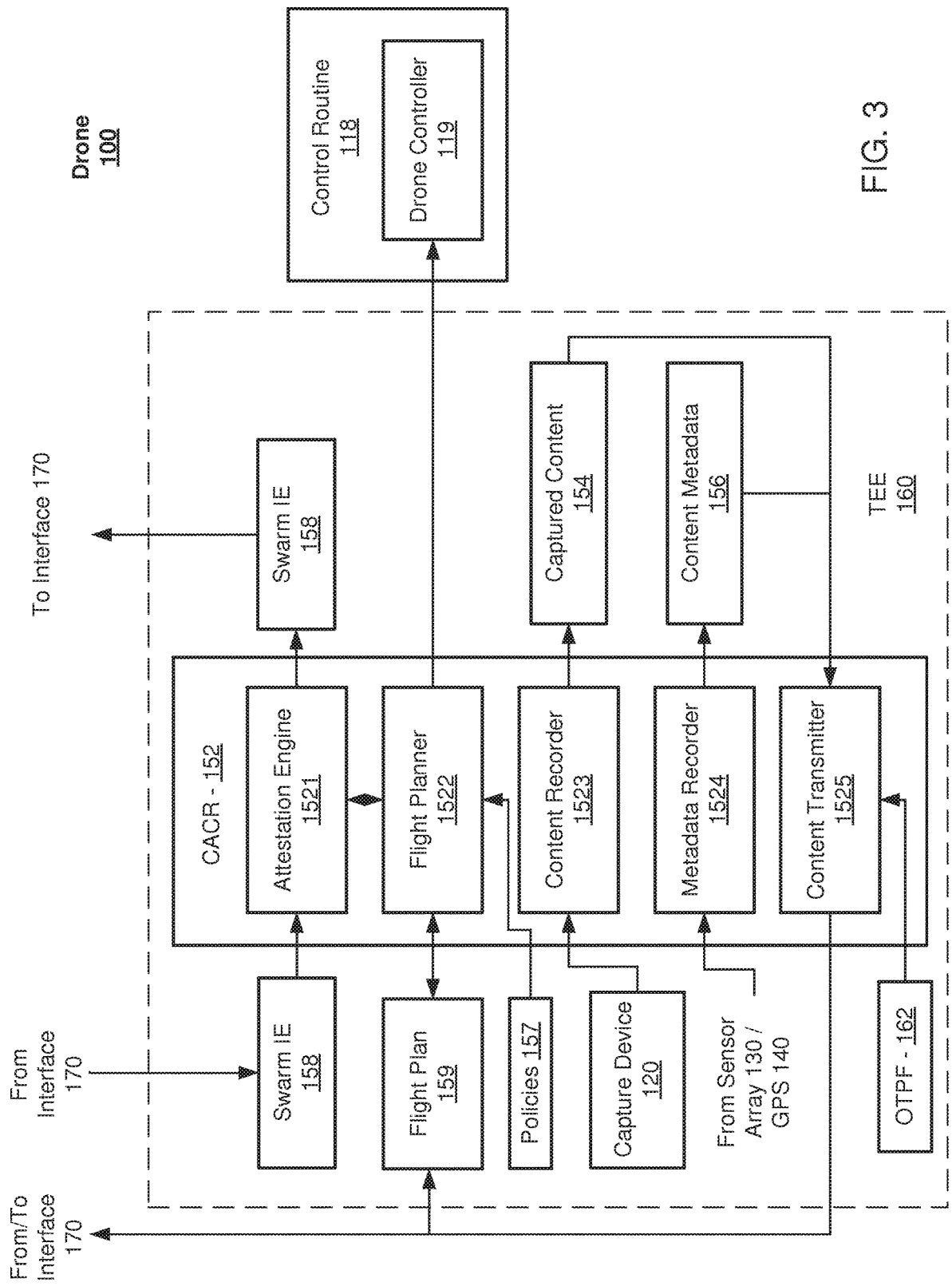
FIG. 3 illustrates a block diagram of aspects of the operation of the device of FIG. 2 according to an embodiment.
Figure 4:
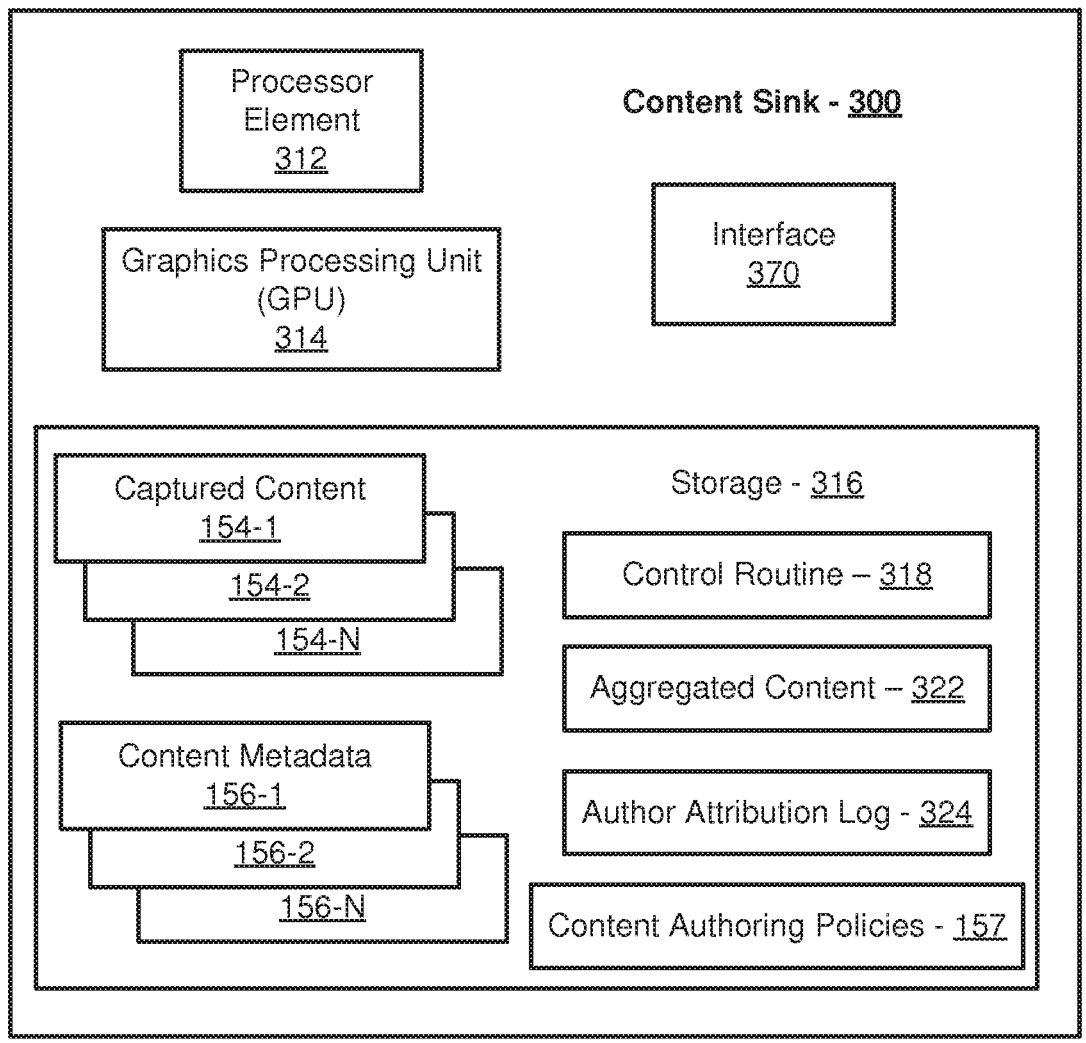
FIG. 4 illustrates a block diagram of a device of the system of FIG. 1 according to an embodiment.
Figure 5:
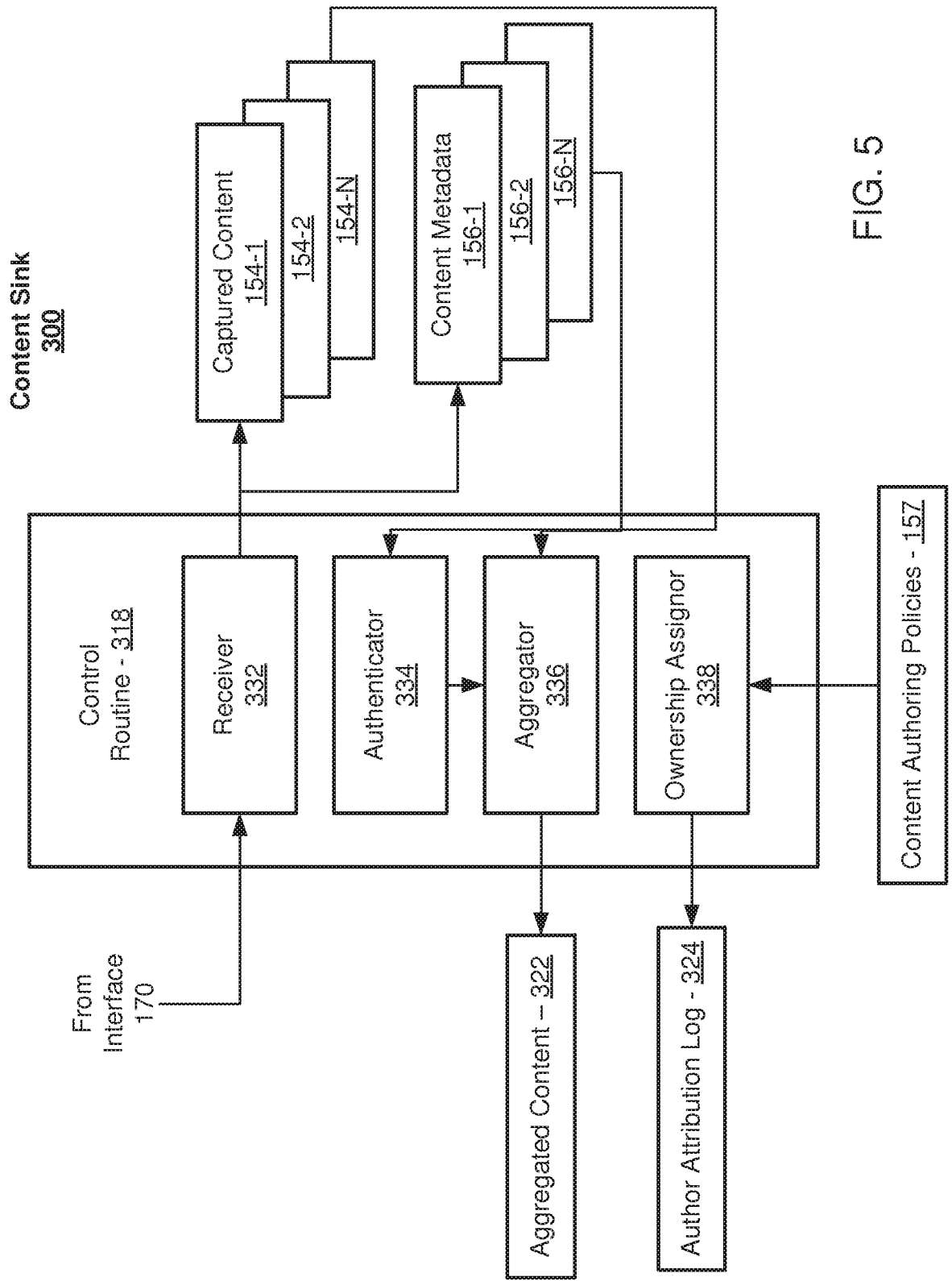
FIG. 5 illustrates a block diagram of aspects of the operation of the device of FIG. 4 according to an embodiment.
Figure 6:
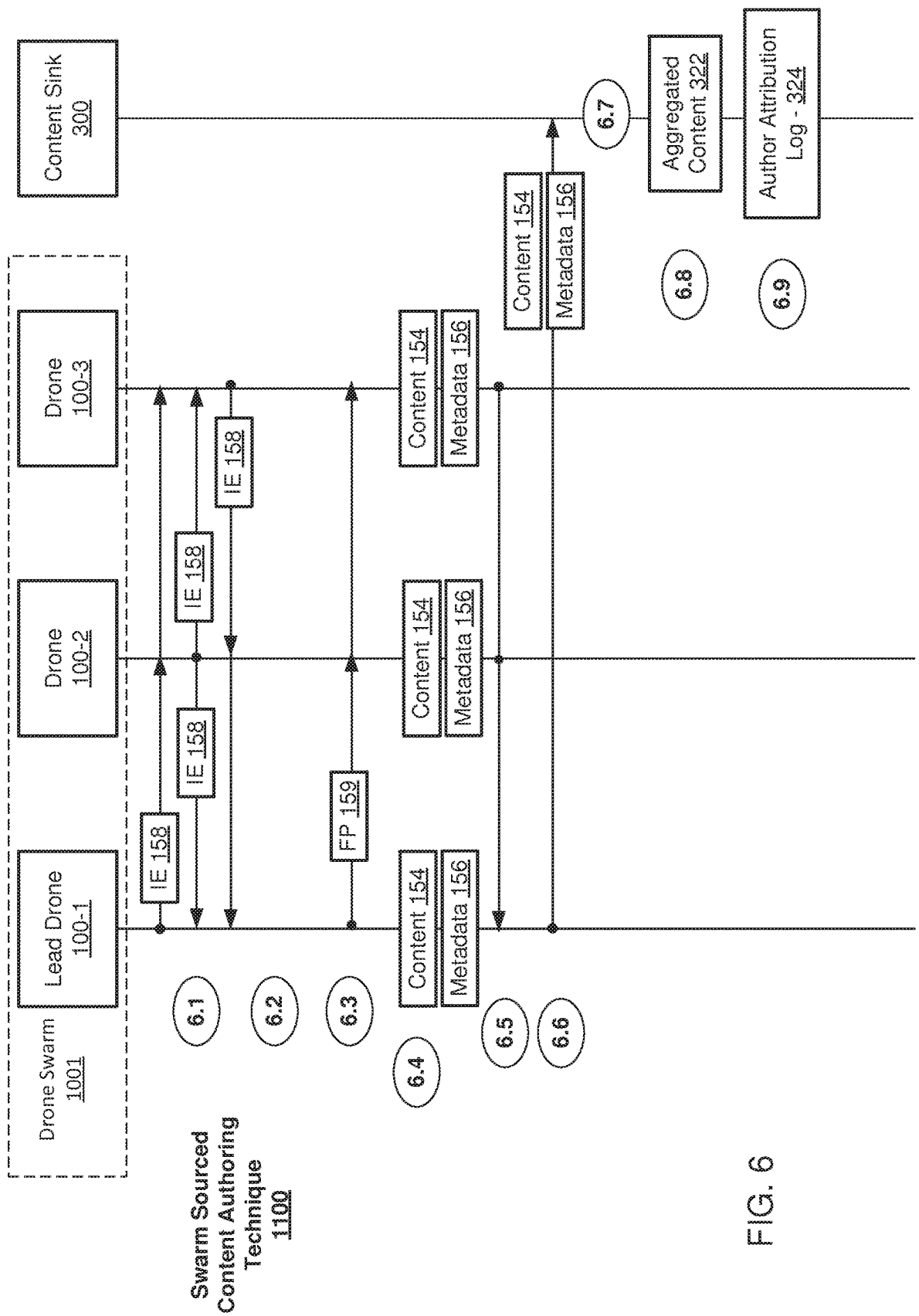
FIG. 6 illustrates a technique according to an embodiment.
Figure 7:
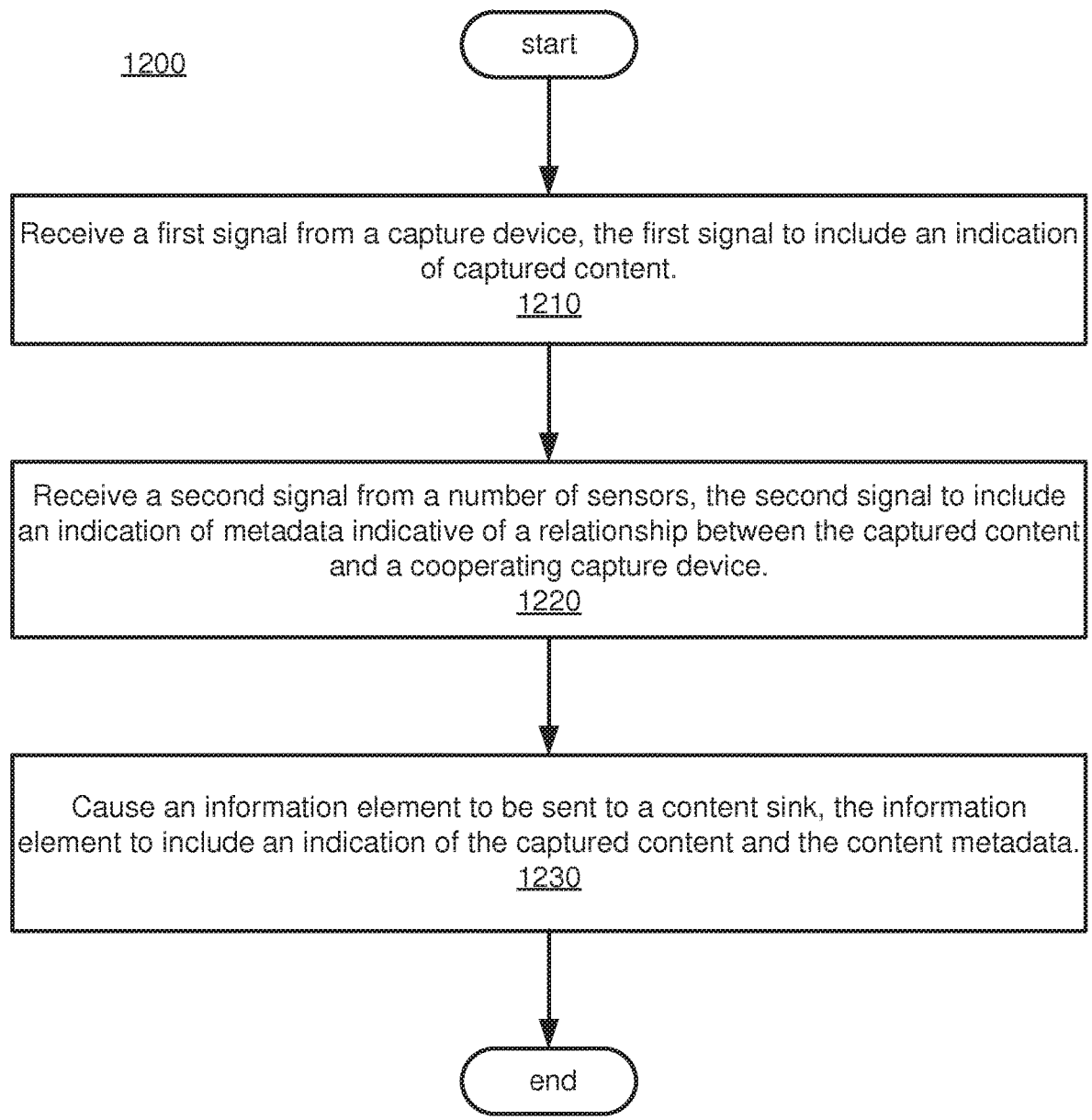
FIGS. 7-8 each illustrate logic flows according to various embodiments.
Figure 8:
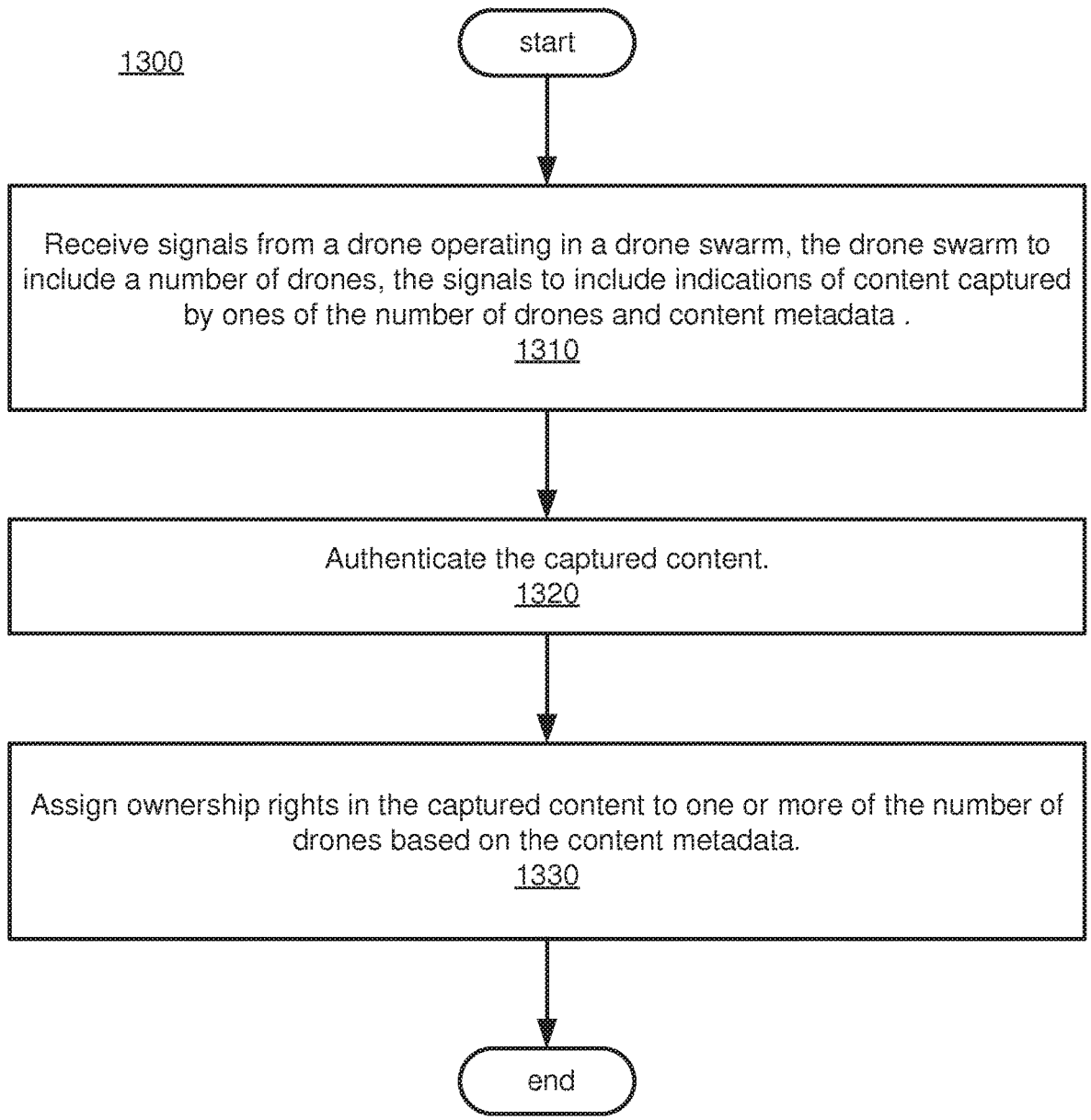

FIGS. 2-3 illustrate examples of a drone 100-a, FIGS. 4-5 illustrate examples of the content sink 300. FIG. 6 illustrates an example of a technique for drone swarm sourced content authoring that may be implemented by the system 1000, and FIGS. 7-8 illustrate examples of logic flows that may be implemented by a drone and a content sink, respectively. These examples are described in greater detail below. It is important to note, that these examples are discussed with respect to the system 1000 depicted in FIG. 1, however, examples are not limited in this context. Furthermore, FIGS. 2-3, refer to drone 100 for purposes of clarity, however, it is appreciated that a drone 100 may correspond to any drone in a system implemented according to the present disclosure, such as, for example, the drone 100-1, 100-2, 100-3, 100-4, 100-5, 100-6, or the like.

Turning more specifically to FIG. 2, the example drone 100 is illustrated. The drone 100 may be implemented according to various examples of the present disclosure. In particular, the drone 100 depicted in this figure may be implemented as one of the drones 100-*a* depicted in FIG. 1. However, it is noted that the drones 100-*a* may include more or different components than those illustrated in this figure. The drone 100 can incorporate a processor element 112, a graphics processing unit (GPU) 114, memory 116, a capture device 120, a sensor array 130, a global positioning sensor (GPS) 140, secure storage 150, a one-time programmable fuse (OTPF) 162, an interface 170, and an antenna 172. Furthermore, as depicted, the capture device 120, the sensor array 130, the GPS 140, the secure storage 150, and the OTPF 162 may operate within a trusted execution environment (TEE) 160.

The sensor array 130 may include one or more sensors 132-*b*, where "b" is a positive integer. It is noted, that the sensor array 130 is depicted including sensors 132-1, 132-2, and 132-3 for purposes of clarity. However, the array 130 may include any number of sensors. For example, the sensor array 130 may include a proximity sensor, an accelerometer, a barometer, a gyroscope, a magnetometer, an ambient light sensor, or the like. The memory stores one or more of a drone control routine 118. The secure storage stores one or more of a content authoring control routine 152, captured content 154, content metadata 156, content authoring policies 157, swarm information element (IE) 158, and flight plan 159. It is important to note, that although the term "fight pan" is used, it is not intended to imply the drone(s) 100-*a* are aerial drones. Instead, the drones 100-*a* may be any combination of air, land, water, or other based drones.

In general, the drone control routine 118 incorporates a sequence of instructions operative on the components of the device 100 (e.g., the processor element 112, the GPU 114, or the like) to implement logic to operate the drone. The content authoring control routine 152 incorporates a sequence of instructions operative on the TEE 160 to implement logic to attest to establish or join the drone swarm (e.g., the swarm may include ones of the drones 100-*a*, or the like), for example using the OTPF 162, or the like. Additionally, the content authoring control routine 152 incorporates a sequence of instructions operative on the TEE 160 to generate captured content 154 from the capture device 120; generate content metadata 156 from the sensor array 130 and/or the GPS 140; communicate the swarm IE 158 and/or the flight plan 159 with the drone leader (e.g., the drone 100-1, or the like).

Turning more specifically to FIG. 3, a block diagram of an example of a portion of the drone 100 is depicted. In particular, example aspects of operation of the drone 100 are depicted. In various embodiments, the drone control routine 118 and/or the content authoring control routine (CACR) 152 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor component 112. Where one or more device drivers are included, those device drivers may provide support for any of a variety of other components, whether hardware or software components, of the device 100.

In general, the CACR 152 is configured to attest to join and/or form a drone swarm (e.g., the drone grouping depicted by the system 1000, or the like) and to coordinate the capture of content as described herein while the drone control routine 118 is configured to operate the drone based on flight plan corresponding to the coordinated capture of content.

The CACR 152 may comprise an attestation engine 1521, a flight planner 1522, a content recorder 1523, a metadata recorder 1524, and a content transmitter 1525. The drone control routine 118 may comprise a drone controller 119.

The attestation engine 1521 broadcasts one or more signals to include indications of communication capabilities of the drone 100. In particular, the attestation engine 1521 may broadcast the swarm information element 158 to include an indication of the communication capabilities of the drone 100. In some examples, the attestation engine 1521 may broadcast the swarm information element 158 over all available communication channels (e.g., using interface 170, antenna 174, and/or the like).

Additionally, the attestation engine 1521 may receive one or more signals to include indications of communication capabilities of cooperating content capture devices, such as, for example other drones (e.g., drones 100-*a* depicted in FIG. 1, or the like). In particular, the attestation engine 1521 may receive the swarm information element 158 to include an indication of the communication capabilities of other drones (e.g., cooperating content capture devices, or the like). In some examples, the attestation engine 1521 may receive the swarm information element 158 over one or more available communication channels (e.g., using interface 170, antenna 174, and/or the like).

The attestation engine 1521 may determine capabilities of adjacent drones (e.g., drones to cooperatively capture content in a swarm configuration, or the like) and may authenticate the adjacent drones. For example, the attestation engine may authenticate the adjacent drones via one or more authentication procedures (e.g., . . . ) to form a drone swarm (e.g., the swarm depicted in FIG. 1). In some examples, drones may be partially authenticated. More specifically, content may be sourced from particular drones, however, content will be verified or treated as less reliable versus content sourced from fully authenticated drones.

The attestation engine 1521 may identify a lead drone (e.g., the drone 100-1, or the like) from the drone swarm. With some examples, the attestation engine 1521 may identify a drone from the drones in the swam with the highest amount of residual energy as the lead drone. In some examples, the attestation engine 1521 may identify a drone from the drones in the swam with the highest amount of processing power, storage, memory, or the like, as the lead drone.

In general, the flight planner 1522 may provision and/or load drivers or policies related to content authoring necessary to cooperate with drones in the swarm. Additionally, the flight planner 1522 may coordinate the flight path and areas where content is desired to be acquired. For example, the flight planner 1522 may load the content authoring policies 157 from the secure storage and may receive the flight plan 159 from a lead drone (e.g., the drone 100-1) or the like to include an indication of aspects, geographic regions, targets, or the like of which to capture content.

Furthermore, the flight planner 1522 may determine the drone 100's orientation (e.g., 3D orientation in space, or the like) and the contextual location of the drone with respect to the target (e.g., the target 200) and other drones in the swarm (e.g., other drones 100-*a*, or the like). For example, the flight planner 1522 may determine the contextual orientation of the drone 100 related to the target and other drones based on the swarm IE 158. Based on the determined location and orientation of the drone, the flight planner 1522 may update the flight plan. For example, the flight plan may be updated based on the content authoring policies.

Additionally, the flight planner may send control signals to the drone controller 119 to cause the drone controller 119 to navigate according to the flight plan 159. For example, the drone controller 119 may cause the drone 100 to remain stationary, to turn to a different orientation, to move to a different geographic location, or the like.

In general, the content recorder 1523 encrypts captured content to securely transmit the content to a content sink device (e.g., content sink 300, or the like). In some examples, the content recorder 1523 receives signals from the capture device 120 to include indication of captured content 154 and encrypts the captured content. For example, the content recorder 1523 may encrypt the captured content using credentials based on the OTPF 162.

In general, the metadata recorder 1524 encrypts captured metadata to securely transmit the metadata to a content sink device (e.g., content sink 300, or the like). In some examples, the metadata recorder 1524 receives signals from the sensor array 130 and/or GPS 140 to include indication of metadata 156 related to the captured content 154 and encrypts the metadata. For example, the metadata recorder 1524 may encrypt the metadata using credentials based on the OTPF 162.

In general, the content transmitter 1525 causes the interface 170 to send signals to include indications of the encrypted captured content 154 and the encrypted content metadata 156. For example, the content transmitter 1525 may transmit signals to include an indication of the content 154 and the metadata 156 to a drone leader (e.g., the drone leader 100-1, or the like). In some examples, the content transmitter 1525 may transmit signals to include an indication of the content 154 and the metadata 156 to a content sink (e.g., the content sink 300, or the like). In some examples (e.g., when the drone 100 is acting as a drone leader,) the content transmitter 1525 may receive signals to include an indication of content and metadata from other drones in the swarm and may relay or transmit signal to include an indication of the received content and metadata to a content sink.

Turning more specifically to FIG. 4, an example of a portion of the drone sink 300 is illustrated. The drone sink 300 may be implemented according to various examples of the present disclosure. The content sink 300 can incorporate a processor element 312, a graphics processing unit (GPU) 314, memory 316, an interface 170, and an antenna 172. The memory 316 stores one or more of a control routine 318, captured content 154-1 to 154-N, content metadata 156-1 to 154-N, content authoring policies 157, a rights log 320, and aggregated content 322.

In general, the control routine 318 incorporates a sequence of instructions operative on the components of the device 300 (e.g., the processor element 312, the GPU 314, or the like) to implement logic to decrypt the verify the authenticity of the received content and to assign or track ownership based of the content based on the metadata.

Turning more specifically to FIG. 5, a block diagram of an example of a portion of the sink 300 is depicted. In particular, example aspects of operation of the sink 300 are depicted. In various embodiments, the control routine 318 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor component 312. Where one or more device drivers are included, those device drivers may provide support for any of a variety of other components, whether hardware or software components, of the sink 300.

In general, the control routine 318 is configured to receive encrypted content and metadata from drones in the system 1000 (e.g., from each of the drones directly and/or via a drone leader, or the like), authenticate the received content and assign ownership to portions of the received content. With some examples, the control routine 318 may include a receiver 332, an authenticator 334, an aggregator 336, and an ownership assignor 338.

In general, the receiver 332 receives signals (e.g., via the interface 370, or the like) to include indications of captured content 154 and the content metadata 156 corresponding to various drones in the system 1000. For example, the receiver 332 may receive signals to include an indication of the content 154 and the metadata 156 from a drone leader (e.g., the drone leader 100-1, or the like). It is to be appreciated, that the sink 300, and particularly, the receiver 332 may receive a number (e.g., N) of different samples of content. Accordingly, captured content 154-1, 154-2 to 154-N and content metadata 156-1, 156-2 to 156-N are depicted. The content 154-1 may not necessarily correspond to the drone 100-1, but instead is intended to imply a single sample of received content, which may have been sourced by the drone 100-1, or another drone in the swarm 1000.

The authenticator 334 may authenticate the received content 154. In particular, the authenticator 334 may determine whether the received content was sourced by an authenticated drone in the swarm 1000. For example, the authenticator 334 may determine whether the received content is encrypted based on trusted credentials (e.g., one of the OTPFs from an authenticated drone, or the like).

In general, the aggregator 336 may aggregate the content from the multiple drones in the swarm in to a single stream of aggregated content 322. For example, the aggregator 336 may splice the content together, may remove overlapping samples, may perform various content processing (e.g., enhancement, clarification, etc.) operations on the content to form the aggregated content 322.

In general, the ownership assignor 336 may generate the rights log 320 to include indications of ownership in portions of the of the aggregated content 322. In particular, the assignor 336 may determine, based on the captured content 154-n, the content metadata 156-n, and the content authoring policies 157, ownership assignments for portions of the aggregated content 322.

In various embodiments, the processor elements 112 and/or 312 may include any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5C), Core i7®, Atom®, Itanium®, Pentium®, Xeon® or XScale® processor. Further, one or more of these processor elements may include a multi-core processor (whether the multiple cores coexist on the same or separate dies), and/or a multi-processor architecture of some other variety by which multiple physically separate processors are in some way linked. Furthermore, in various embodiments any number of the processor elements 110, 210, and/or 410 may include a trusted execution environment (e.g., Intel CSE®, Intel ME®, Intel VT®, Intel SGX®, ARM TrustedZone®, or the like) to provide for the processing and/or storing of sensitive information. The trusted execution environment may be access using the geo-location techniques described herein.

In various embodiments, the GPUs 114 and/or 314 may include any of a wide variety of commercially available graphics processing units. Further, one or more of these graphics processing units may have dedicated memory, multiple-threaded processing and/or some other parallel processing capability.

In various embodiments, the memory 116, 316, and/or the secure storage 150 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the TEE 160 may comprise logic, functions, features, and/or storage to securely implement the functions described herein. It is important to note, that the TEE 160 may be incorporated into the processor element 112 and/or the secure storage 150. However, for purposes of clarity, the TEE 160 is depicted separate from the processor element 112. In some examples, the TEE 160 may be implemented as a secure enclave, a secure co-processor, or the like.

In various embodiments, the capture device 120 may be any of a variety of content capture devices, such as, for example, a camera, a video recorder, an audio recorder, an infrared capture device, a RADAR capture device, or the like.

In various embodiments, the interfaces 170 and/or 370 may employ any of a wide variety of signaling technologies enabling the components to be coupled via antennas 172 and/or 372 to network 999 and/or other drones 100-a in the system 1000.

In general, the drone 100 and/or the sink 300 may be communicatively coupled (e.g., ad-hoc, directly, or via the network 999) to other devices (e.g., devices in the system 1000). In general, the devices 100 and/or 300 may exchange data and/or information related to drone swarm sourced content, such as, the captured content 154, the content metadata 156, the content authoring policies 157, the swarm IE 158, and/or the flight plan 159. In some examples, the devices 100 and/or 300 may exchange data (even unrelated data) with other devices not depicted. Furthermore, the devices 100 and/or 300 may be operably connected to additional network (e.g., the Internet, or the like) via the network 999 or another network not shown.

In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission. Accordingly, the interfaces 170 and/or 370 may include circuitry providing at least some of the requisite functionality to enable such coupling. However, the interfaces 170 and/or 370 may also be at least partially implemented with sequences of instructions executed by the processor elements (e.g., to implement a protocol stack or other features). Where one or more portions of the network 999 employs electrically and/or optically conductive cabling, the interface may employ signaling and/or protocols conforming to any of a variety of industry standards, including without limitation, RS-232C, RS-422, USB, Ethernet (IEEE-802.3) or IEEE-1394. Alternatively or additionally, where one or more portions of the network 999 entails the use of wireless signal transmission, corresponding ones of these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. It should be noted that although the interface is depicted as a single block, it might include multiple interfaces that may be based on differing signaling technologies. This may be the case especially where one or more of these interfaces couples the components to more than one network, each employing differing communications technologies.

Turning more specifically to FIG. 6, aspects of the operation of the system 1000 are depicted in greater detail. In particular, a swarm sourced content authoring technique 1100 is depicted. As depicted, the technique 1100 includes operations or blocks 6.X, where X is a positive integer. Furthermore, the technique 1100 is described with reference to the system 1000 of FIG. 1, the drone 100 of FIGS. 2-3, and the content sink 300 of FIGS. 4-5. In particular, the technique 1100 is depicted with respect to the drones 100-1, 100-2, and 100-3 as well as the content sink 300. However, this is not intended to be limiting. In particular, the technique 1100 can be implemented with any number of drones 100-*a*.

Beginning at block 6.1, the drones 100-1, 100-2, and 100-3 may attest to each other. In particular, the drones 100-1, 100-2, and 100-3 may broadcast information elements 158 to include indications of the credentials and/or position (e.g., in 3D space) of the drones. Additionally, at block 6.1, the drones 100-1, 100-2, and 100-3 may receive information elements broadcast by other drones in the system 1000. For example, the attestation engine (e.g., the attestation engine 1521, or the like) of the drones may broadcast and/or receive the information elements 158.

Continuing to block 6.2, the drones 100-1 may authenticate one or more of the other drones to form the drone swarm 1001 and determine a lead drone from the drones in the swarm 1001. For example, the drone with the largest residual battery store (e.g., the drone 100-1, or the like) may be selected as the lead drone.

Continuing to block 6.3, the lead drone 100-1 may send an information element to the other drones in the swarm, the information element to include an indication of a flight plan for the drones. In particular, the information element may include an indication of aspects of a target to capture and/or positional information related to the capture of information. For example, the flight planner of the lead drone 100-1 may cause an information element to be communicated (e.g., via the Internet, via the network 999, via a peer-to-peer connection, or the like) to the flight planner of the other drones in the swarm. With some examples, the lead drone may coordinate (e.g., as described) the capture of information related to the target based on content authoring policies 157. Additionally, the lead drone may coordinate the capture of information based on the positional relationship of the drones in the swarm to each other and/or the target.

In some examples, at block 6.3, each drone may determine a flight plan based on the content authoring policies 157. Additionally, each drone may coordinate the capture of information based on the positional relationship of the drones in the swarm to each other and/or the target. For example, at block 6.3, the lead drone may not necessarily determine a flight plan for the other drones and communicate the flight to the drones. Instead, each drone may determine its own flight plan based on the positional relationship to the other drones determined, for example, from the information element 158, or the like.

Continuing to block 6.4, each of the drones in the swarm may capture content and metadata related to the captured content. For example, the drones 100-1, 100-2, and 100-3 may capture content (e.g., video, audio, images, heat signatures, or the like) related to the target. Additionally, the drones 100-1, 100-2, and 100-3 may capture metadata related to the captured content. For example, the content recorder and metadata recorder (e.g., the content recorder 1523 and metadata recorder 1524, or the like) may capture content metadata as described herein.

Continuing to block 6.5, ones of the drones may communicate the captured content and metadata to the lead drone. In particular, with some examples, at block 6.5, the drones 6.2 and 6.3 may send signals to include indications of the captured content and the metadata to the lead drone 100-1. With some examples, the drones 100-2 and 100-3 may encrypt the captured content and metadata prior to sending to the captured content and metadata to the lead drone 100-1. In some examples, the captured content and metadata may be encrypted by the content transmitter (e.g., the content transmitter 1525, or the like) using the OTP 162.

Continuing to block 6.6, the lead drone may communicate the drone sourced content (e.g., the content captured from the drones 100-1, 100-2, and 100-3, or the like) to the content sink 300. In particular, the lead drone may cause signals to be communicated to the content sink (e.g., via the Internet, via the network 999, via a peer-to-peer connection, or the like), the signal to include an indication of the content and metadata captured by the swarm of drones. Additionally, at block 6.6, the content sink may receive signals (e.g., from the lead drone 100-1, or the like) to include indications of content captured by drones in the swarm 1001 and metadata related to the captured content.

Continuing to block 6.7, the content sink 300 may decrypt the content and metadata received from the lead drone 100-1. In particular, the content sink 300 may decrypt the content and metadata captured by each of the drones 100-1, 100-2, and 100-3. Additionally, at block 6.7, the content sink 300 may authenticate the content to determine whether it was generated and/or captured by an authenticated drone.

Continuing to block 6.8, the content sink 300 may aggregate the content received from the drones in the swarm into a single content stream. In particular, the aggregator 336 may generate aggregated content 322 from the captured content.

Continuing to block 6.9, the content sink 300 may assign rights and/or ownership to portions of the aggregated content based on the captured content, the metadata associated with the captured content, and the content authoring policies 157. In particular, the ownership assignor 338 may determine ownership interests (e.g., whole, partial, fractional, or the like) in portions of the aggregated content 322.

With some examples, the lead drone 100-1 may log all transactions completed by the swarm 1001. For example, the lead drone 100-1 may log activity (e.g., information element, content, metadata, or the like) from each of the drones in the swarm 1001. Such activity logs may be used to identify malicious and/or defective drones within the swarm.

FIGS. 7-8 illustrate embodiments of logic flows for providing information capture by multiple drones, which may operate in a swarm, while maintaining rights and/or value assigned to the content authored by each drone or by subsets of drones. In general, the logic flows may be implemented by portions of the system 1000 described herein. In particular, one or more of the drones may implement the logic flow depicted in FIG. 7 while the content sink may implement the logic flow depicted in FIG. 8. It is to be appreciated, that the logic flows are described with reference to FIGS. 1-6 and particularly, the drone 100 and the content sink 300. However, examples are not limited in this context and in particular, systems and/or devices including similar or different component to those depicted in FIGS. 1-6 may implement the logic flows.

Turning more specifically to FIG. 7, a logic flow 1200 may begin at block 1210. At block 1210, "receive a first signal from a capture device, the first signal to include an indication of captured content," the CACR 152 may receive signals from the capture device 120, the signals to include indications of the captured content 154. For example, the CACR may receive video, audio, infrared, or the like signals from the capture device 120.

Continuing to block 1220, "receive a second signal from a number of sensors, the second signal to include an indication of metadata indicative of a relationship between the captured content and a cooperating capture device," the CACR 152 may receive signals from sensor array 130 and/or GPS 140. The received signals to include indications of the content metadata 156.

Continuing to block 1230, "cause an information element to be sent to a content sink, the information element to include an indication of the captured content and the content metadata," the CACR 152 may cause an information element to be sent to the content sink 300. For example, the CACR 152 may cause the captured content 154 and the content metadata 156 to be sent to the content sink 300. In some examples, the information element may be encrypted (e.g., via the OTPF 162, or the like). In some examples, the CACR 152 may encrypt and send the information element directly to the content sink 300. In some examples, the CACR 152 may encrypt and send the information element to the content sink 300 via a lead drone (e.g., the lead drone 100-1, or the like).

Turning more specifically to FIG. 8, the logic flow 1300 is depicted. The logic flow 1300 may begin at block 1310. At block 1310, "receive signals from a drone operating in a drone swarm, the drone swarm to include a number of drones, the signals to include indications of content captured by ones of the number of drones and content metadata," the control routine 318 may receive captured content 154-1, 154-2, to 154-N and content metadata 156-1, 156-2, to 156-N.

Continuing to block 1320, "authenticate the captured content," the control routine 318 may authenticate the captured content 154-1, 154-2, to 154-N and/or the content metadata 156-1, 156-2, to 156-N. For example, the control routine 318 may determine whether the content was generated, encrypted, and/or transmitted by an authorized drone within the swarm.

Continuing to block 1330, "assign ownership rights in the captured content to one or more of the number of drones based on the content metadata," the control routine 318 may assign ownership interests in the captured content (e.g., for licensing, micropayments, or the like) to one or more of the drones within the swarm based on the content metadata. With some examples, the control routine 318 may generate aggregated content from the captured content and assign ownership rights to portions of the aggregated content to drone(s) within the drone swarm based on the captured content and the content metadata.

Figure 9:
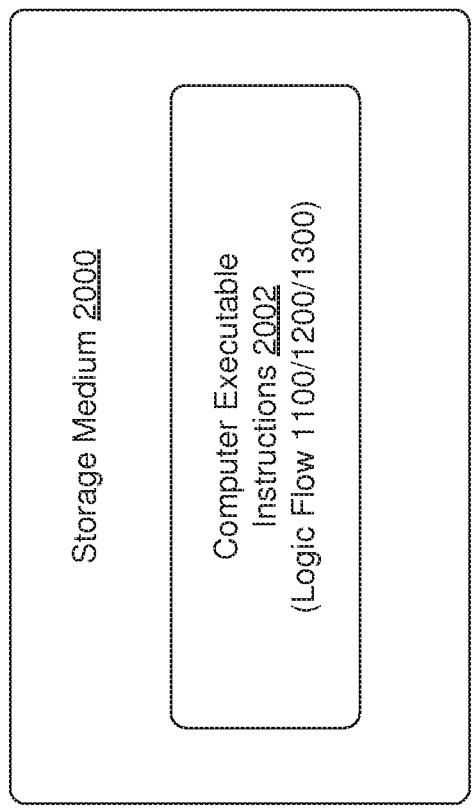
FIG. 9 illustrates an embodiment of computer-readable storage medium.

FIG. 9 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement logic flow 1100. In some examples, the storage medium 2000 may store various types of computer executable instructions to implement logic flow 1200. In some examples, the storage medium 2000 may store various types of computer executable instructions to implement logic flow 1300.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
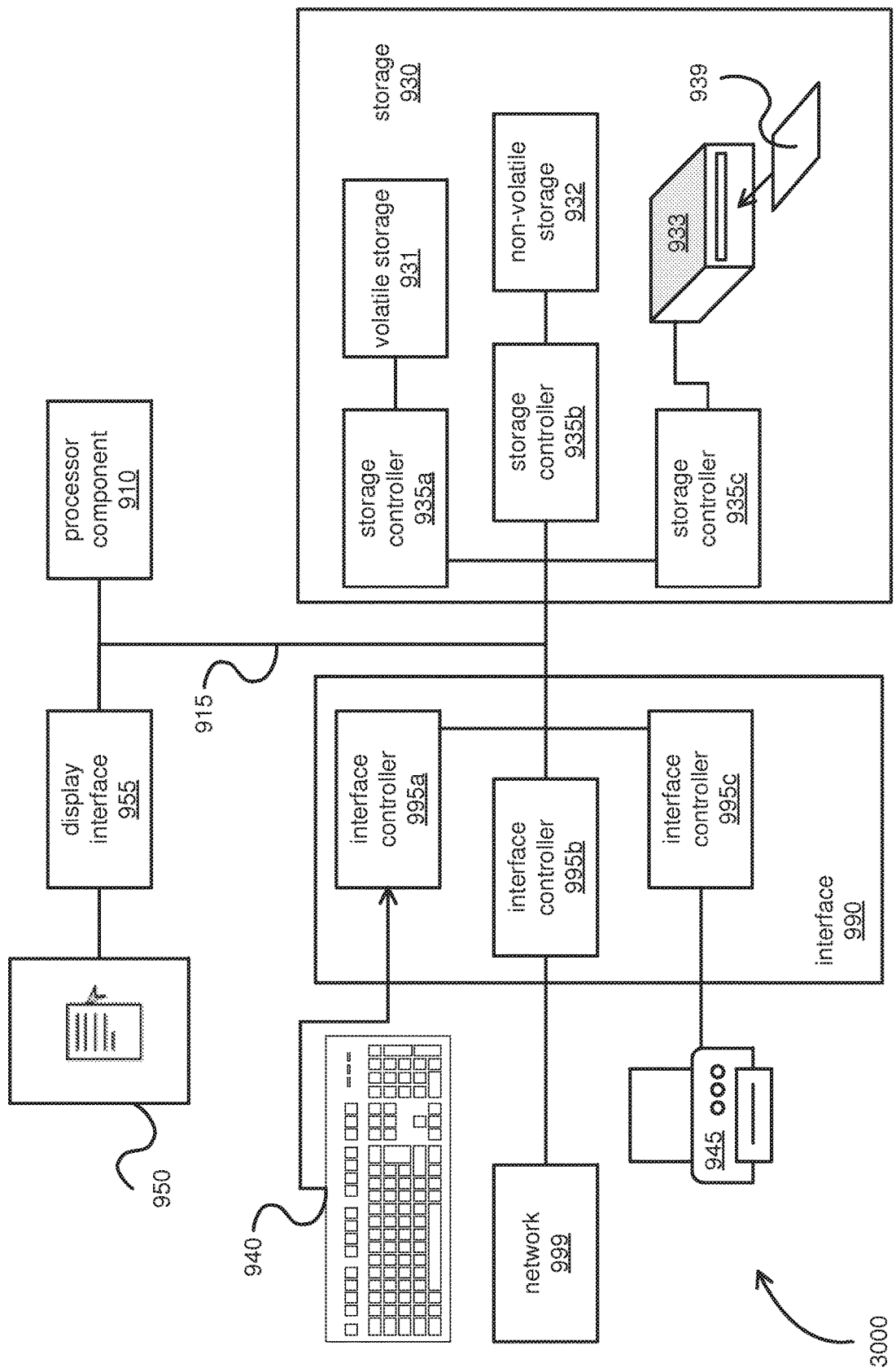
FIG. 10 illustrates an embodiment of a processing architecture.

FIG. 10 illustrates an embodiment of an exemplary processing architecture 3000 suitable for implementing various embodiments as previously described. More specifically, the processing architecture 3000 (or variants thereof) may be implemented as part of the system 1000 of FIG. 1, the drone 100 of FIGS. 2-3, and/or the content sink of FIGS. 4-5.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor element, the processor element itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3000, a computing device incorporates at least a processor element 910, a storage 930, an interface 990 to other devices, and coupling 915. Depending on various aspects of a computing device implementing the processing architecture 3000, including its intended use and/or conditions of use, such a computing device may further incorporate additional components, such as without limitation, a counter element 915.

The coupling 915 incorporates one or more buses, point-to-point interconnects, transceivers, buffers, crosspoint switches, and/or other conductors and/or logic that communicatively couples at least the processor element 910 to the storage 930. The coupling 915 may further couple the processor element 910 to one or more of the interface 990 and the display interface 955 (depending on which of these and/or other components are also present). With the processor element 910 being so coupled by couplings 915, the processor element 910 is able to perform the various ones of the tasks described at length, above, for whichever ones of the computing devices 100, 300 and 600 implement the processing architecture 3000. The coupling 915 may be implemented with any of a variety of technologies or combinations of technologies by which signals are optically and/or electrically conveyed. Further, at least portions of couplings 915 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor element 910 may include any of a wide variety of commercially available processors, employing any of a wide variety of technologies and implemented with one or more cores physically combined in any of a number of ways.

As previously discussed, the storage 930 may include one or more distinct storage devices based on any of a wide variety of technologies or combinations of technologies. More specifically, as depicted, the storage 930 may include one or more of a volatile storage 931 (e.g., solid state storage based on one or more forms of RAM technology), a non-volatile storage 932 (e.g., solid state, ferromagnetic or other storage not requiring a constant provision of electric power to preserve their contents), and a removable media storage 933 (e.g., removable disc or solid state memory card storage by which information may be conveyed between computing devices). This depiction of the storage 930 as possibly comprising multiple distinct types of storage is in recognition of the commonplace use of more than one type of storage device in computing devices in which one type provides relatively rapid reading and writing capabilities enabling more rapid manipulation of data by the processor element 910 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 931 is present and is based on RAM technology, the volatile storage 931 may be communicatively coupled to coupling 915 through a storage controller 935a providing an appropriate interface to the volatile storage 931 that perhaps employs row and column addressing, and where the storage controller 935a may perform row refreshing and/or other maintenance tasks to aid in preserving information stored within the volatile storage 931. By way of another example, where the non-volatile storage 932 is present and includes one or more ferromagnetic and/or solid-state disk drives, the non-volatile storage 932 may be communicatively coupled to coupling 915 through a storage controller 935b providing an appropriate interface to the non-volatile storage 932 that perhaps employs addressing of blocks of information and/or of cylinders and sectors. By way of still another example, where the removable media storage 933 is present and includes one or more optical and/or solid-state disk drives employing one or more pieces of removable machine-readable storage media 939, the removable media storage 933 may be communicatively coupled to coupling 915 through a storage controller 935c providing an appropriate interface to the removable media storage 933 that perhaps employs addressing of blocks of information, and where the storage controller 935c may coordinate read, erase and write operations in a manner specific to extending the lifespan of the machine-readable storage media 939.

One or the other of the volatile storage 931 or the non-volatile storage 932 may include an article of manufacture in the form of a machine-readable storage media on which a routine comprising a sequence of instructions executable by the processor element 910 may be stored, depending on the technologies on which each is based. By way of example, where the non-volatile storage 932 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 932 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor element 910 may initially be stored on the machine-readable storage media 939, and the removable media storage 933 may be subsequently employed in copying that routine to the non-volatile storage 932 for longer term storage not requiring the continuing presence of the machine-readable storage media 939 and/or the volatile storage 931 to enable more rapid access by the processor element 910 as that routine is executed.

As previously discussed, the interface 990 may employ any of a variety of signaling technologies corresponding to any of a variety of communications technologies that may be employed to communicatively couple a computing device to one or more other devices. Again, one or both of various forms of wired or wireless signaling may be employed to enable the processor element 910 to interact with input/output devices (e.g., the depicted example keyboard 940 or printer 945) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c. The interface controller 995a may employ any of a variety of types of wired digital serial interface or radio frequency wireless interface to receive serially transmitted messages from user input devices, such as the depicted keyboard 940. The interface controller 995b may employ any of a variety of cabling-based or wireless signaling, timings and/or protocols to access other computing devices through the depicted network 999 (perhaps a network comprising one or more links, smaller networks, or perhaps the Internet). The interface 995c may employ any of a variety of electrically conductive cabling enabling the use of either serial or parallel signal transmission to convey data to the depicted printer 945. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually incorporates) a display (e.g., the depicted example display 950), such a computing device implementing the processing architecture 3000 may also incorporate the display interface 955. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 955 in a communicative coupling of the display 950 may make use of signaling and/or protocols that conform to any of a variety of industry standards, including without limitation, any of a variety of analog video interfaces, Digital Video Interface (DVI), DisplayPort, etc.

More generally, the various elements of the computing devices 100, 200, and 400 may include various hardware elements, software elements, or a combination of both. Examples of hardware elements may include devices, logic devices, components, processors, microprocessors, circuits, processor elements, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The disclosure now turns to providing various examples implementations.

Example 1. An apparatus, comprising: logic, a portion of which is implemented in hardware, the logic to comprise: a content recorder, the content recorder to receive a first signal from a capture device, the first signal to include an indication of captured content; a metadata recorder to receive a second signal from one or more sensors, the second signal to include an indication of content metadata, the content metadata indicative of a relationship between the captured content and a cooperating capture device; and a content transmitter, the content transmitter to cause an information element to be sent to a content sink device, the information element to include an indication of the captured content and the content metadata.

Example 2. The apparatus of example 1, the content recorder, the metadata recorder, and the content transmitter to execute in a trusted execution environment of a drone.

Example 3. The apparatus of any one of examples 1 to 2, the content transmitter to encrypt the information element.

Example 4. The apparatus of example 3, comprising a one-time programmable fuse (OTPF), the content transmitter to encrypt the information element based on the OTPF.

Example 5. The apparatus of any one of examples 1 to 2, the logic to comprise an attestation engine, the attestation engine to: broadcast a first attestation signal to include an indication of a communication capability of the apparatus; receive one or more secondary attestation signals to include an indication of a communication capability of one or more cooperating content capture devices; and identify a content acquisition leader from the apparatus and the one more cooperating content capture devices.

Example 6. The apparatus of example 5, the logic to identify the content acquisition leader as the one of the apparatus or the one or more cooperating content capture devices based on an amount of residual energy available to the apparatus or the one or more cooperating content capture devices.

Example 7. The apparatus of any one of examples 1 to 2, the content transmitter to cause an information element to be sent to a content sink device, the information element to include an indication of the captured content and the content metadata comprising: sending a first information element to a content acquisition leader, the first information element to include an indication of the captured content and the content metadata, the content acquisition leader to send a second information element to the content sink, the second information element to include an indication of the captured content and the content metadata.

Example 8. The apparatus of any one of examples 1 to 2, comprising an antenna and a radio operably coupled to the antenna, the content transmitter to send a control signal to the radio to cause the radio to send the information element via the antenna.

Example 9. An apparatus, comprising: logic, a portion of which is implemented in hardware, the logic to comprise: a receiver, the receiver to receive one or more signals from a drone operating in a drone swarm, the drone swarm to include a plurality of drones, the one or more signal to include an indication of captured content and content metadata, the captured content to be captured by one or more of the plurality of drones; an authenticator to authenticate the captured content; and an ownership assignor to assign ownership rights in the captured content to one or more of the plurality of drones.

Example 10. The apparatus of example 9, comprising an aggregator to generate an aggregated content stream based on the captured content.

Example 11. The apparatus of example 10, the ownership assignor to assign ownership in a portion of the aggregated content stream to a one of the plurality of drones based on the captured content and content metadata.

Example 12. The apparatus of example 10, the ownership assignor to determine a license to the aggregated content based on the assigned ownership rights.

Example 13. The apparatus of example 10, the ownership assignor to determine a royalty payment to the aggregated content based on the assigned ownership rights.

Example 14. An apparatus, comprising: a trusted execution environment (TEE); an attestation engine executable by the TEE, the attestation engine to broadcast a first attestation signal to include an indication of a communication capability of the apparatus, receive one or more secondary attestation signals to include an indication of a communication capability of one or more cooperating content capture devices, and identify a content acquisition leader from the apparatus and the one more cooperating content capture devices; a content recorder executable by the TEE, the content recorder to receive a first signal from a capture device, the first signal to include an indication of captured content; a metadata recorder executable by the TEE, the metadata recorder to receive a second signal from one or more sensors, the second signal to include an indication of content metadata; and a content transmitter executable by the TEE, the content transmitter to encrypt the captured content and the content metadata and to send a signal to include an indication of the encrypted captured content and encrypted content metadata to the content acquisition leader.

Example 15. The apparatus of example 14, comprising a one-time programmable fuse (OTPF), the content transmitter to encrypt the captured content and content metadata based on the OTPF.

Example 16. The apparatus of example 14, comprising a flight planner executable by the TEE, the flight planner to determine an orientation of the apparatus in three-dimensional (3D) space in relation to both the one more cooperating content capture devices and a target, and to determine a flight plan along which to capture content based on the determined orientations.

Example 17. The apparatus of example 14, comprising a flight planner executable by the TEE, the flight planner to receive an indication of a flight plan along which to capture content based on the determined orientation.

Example 18. A system comprising: a drone control system; a trusted execution environment (TEE); a flight planner executable by the TEE, the flight planner to send a control signal to the drone control system to include an indication to traverse a flight path along which to capture content related to a target in conjunction with one or more cooperating content capture drones.

Example 19. The system of example 18, comprising a content recorder executable by the TEE, the content recorder to receive a first signal from a capture device, the first signal to include an indication of captured content.

Example 20. The system of example 19, comprising a metadata recorder executable by the TEE, the metadata recorder to receive a second signal from one or more sensors, the second signal to include an indication of content metadata, the content metadata indicative of a relationship between the captured content and the one or more cooperating capture device.

Example 21. The system of example 20, comprising an attestation engine executable by the TEE, the attestation engine to broadcast a first attestation signal to include an indication of a communication capability of the apparatus, receive one or more secondary attestation signals to include an indication of a communication capability of the one or more cooperating content capture devices, and identify a content acquisition leader from the apparatus and the one more cooperating content capture devices.

Example 22. The system of example 21, comprising a content transmitter executable by the TEE, the content transmitter to encrypt the captured content and the content metadata and to send a signal to include an indication of the encrypted captured content and encrypted content metadata to a content acquisition leader.

Example 23. The system of example 22, comprising a one-time programmable fuse (OTPF), the content transmitter to encrypt the captured content and content metadata based on the OTPF.

Example 24. The system of example 21, the flight planner to receive an indication of the flight path from the content acquisition leader.

Example 25. The system of example 18, comprising a housing and a propulsion system, the TEE disposed in the housing and the drone control system operably coupled to the propulsion system, the drone control system to cause the propulsion system to navigate a trajectory substantially along the flight path.

Example 26. The system of example 25, comprising a battery operably coupled to the propulsion system.

Example 27. At least one machine-readable storage medium comprising instructions that when executed by a trusted execution environment (TEE), cause the TEE to: receive a first signal from a capture device, the first signal to include an indication of captured content; receive a second signal from one or more sensors, the second signal to include an indication of content metadata, the content metadata indicative of a relationship between the captured content and a cooperating capture device; and cause an information element to be sent to a content sink device, the information element to include an indication of the captured content and the content metadata.

Example 28. The at least one machine-readable storage medium of example 27, comprising instructions that further cause the TEE to encrypt the information element.

Example 29. The at least one machine-readable storage medium of example 27, comprising instructions that further cause the TEE to encrypt the information element based at least in part on a one-time programmable fuse (OTPF).

Example 30. The at least one machine-readable storage medium of example 27, comprising instructions that further cause the TEE to: broadcast a first attestation signal to include an indication of a communication capability of the apparatus; receive one or more secondary attestation signals to include an indication of a communication capability of one or more cooperating content capture devices; and identify a content acquisition leader from the apparatus and the one more cooperating content capture devices.

Example 31. The at least one machine-readable storage medium of example 27, comprising instructions that further cause the TEE to identify the content acquisition leader as the one of the apparatus or the one or more cooperating content capture devices based on an amount of residual energy available to the apparatus or the one or more cooperating content capture devices.

Example 32. The at least one machine-readable storage medium of example 27, comprising instructions that further cause the TEE to send a first information element to a content acquisition leader, the first information element to include an indication of the captured content and the content metadata, the content acquisition leader to send a second information element to the content sink, the second information element to include an indication of the captured content and the content metadata.

Example 33. At least one machine-readable storage medium comprising instructions that when executed by a computing device, cause the computing device to: receive one or more signals from a drone operating in a drone swarm, the drone swarm to include a plurality of drones, the one or more signal to include an indication of captured content and content metadata, the captured content to be captured by one or more of the plurality of drones; authenticate the captured content; and assign ownership rights in the captured content to one or more of the plurality of drones.

Example 34. The at least one machine-readable storage medium of example 33, comprising instructions that further cause the computing device to generate an aggregated content stream based on the captured content.

Example 35. The at least one machine-readable storage medium of example 33, comprising instructions that further cause the computing device to assign ownership in a portion of the aggregated content stream to a one of the plurality of drones based on the captured content and content metadata.

Example 36. The at least one machine-readable storage medium of example 33, comprising instructions that further cause the computing device to determine a license to the aggregated content based on the assigned ownership rights.

Example 37. The at least one machine-readable storage medium of example 33, comprising instructions that further cause the computing device to determine a royalty payment to the aggregated content based on the assigned ownership rights.

Example 38. A computer-implemented method comprising: receiving a first signal from a capture device, the first signal to include an indication of captured content; receiving a second signal from one or more sensors, the second signal to include an indication of content metadata, the content metadata indicative of a relationship between the captured content and a cooperating capture device; and causing an information element to be sent to a content sink device, the information element to include an indication of the captured content and the content metadata.

Example 39. The computer-implemented method of example 38, comprising encrypting the information element.

Example 40. The computer-implemented method of example 38, comprising encrypting the information element based at least in part on a one-time programmable fuse (OTPF).

Example 41. The computer-implemented method of example 38, comprising: broadcasting a first attestation signal to include an indication of a communication capability of the apparatus; receiving one or more secondary attestation signals to include an indication of a communication capability of one or more cooperating content capture devices; and identifying a content acquisition leader from the apparatus and the one more cooperating content capture devices.

Example 42. The computer-implemented method of example 38, comprising identifying the content acquisition leader as the one of the apparatus or the one or more cooperating content capture devices based on an amount of residual energy available to the apparatus or the one or more cooperating content capture devices.

Example 43. The computer-implemented method of example 38, comprising sending a first information element to a content acquisition leader, the first information element to include an indication of the captured content and the content metadata, the content acquisition leader to send a second information element to the content sink, the second information element to include an indication of the captured content and the content metadata.

Example 44. A computer-implemented method comprising: receiving one or more signals from a drone operating in a drone swarm, the drone swarm to include a plurality of drones, the one or more signal to include an indication of captured content and content metadata, the captured content to be captured by one or more of the plurality of drones; authenticating the captured content; and assigning ownership rights in the captured content to one or more of the plurality of drones.

Example 45. The computer-implemented method of example 44, comprising generating an aggregated content stream based on the captured content.

Example 46. The computer-implemented method of example 44, comprising assigning ownership in a portion of the aggregated content stream to a one of the plurality of drones based on the captured content and content metadata.

Example 47. The computer-implemented method of example 44, comprising determining a license to the aggregated content based on the assigned ownership rights.

Example 48. The computer-implemented method of example 44, comprising determining a royalty payment to the aggregated content based on the assigned ownership rights.

Example 49. An apparatus for a device, the apparatus comprising means for performing the method of any one of examples 38 to 48.

The invention claimed is:

1. A device, comprising:
a camera at a first drone;
a sensor array comprising a gyroscope at the first drone;
a processor at a first drone; and
memory at the first drone, the memory comprising instructions that when executed by the processor cause the processor to:

receive a first signal from the camera, the first signal to include video data;

receive a second signal from the gyroscope, the second signal to include gyroscope data associated with the video data; and communicate information to one or more other drones, via a fourth-generation long term evolution cellular radio telephone service, based on the video data and the gyroscope data associated with the video data to coordinate with the one or more other drones to capture content related to a target.

2. The device of claim 1, the memory comprising instructions that when executed by the processor cause the processor to receive information from at least one of the one or more other drones via the fourth-generation long term evolution cellular radio telephone service.

3. The device of claim 2, wherein the information received from the at least one of the one or more other drones comprises an indication of a target to capture content regarding.

4. The device of claim 2, wherein the information received from the at least one of the one or more other drones comprises an indication of a position of a drone in relation to the target.

5. The device of claim 2, wherein the information received from the at least one or more other drones comprises an aspect of the target to capture content related to.

6. The device of claim 5, wherein the target comprises an event and the aspect of the target to capture content related to comprises a participant in the event.

7. The device of claim 2, wherein the information received from the at least one of the one or more other drones comprises an indication of a flight plan.

8. The device of claim 1, wherein the information communicated to the one or more other drones comprises positional information.

9. The device of claim 1, wherein the sensor array comprises a barometer.

10. The device of claim 1, wherein the sensor array further comprises an accelerometer.

11. At least one non-transitory computer-readable medium comprising a set of instructions that, in response to being executed by a processor circuit of a first drone, cause the processor circuit to:

receive a first signal from a camera at the first drone, the first signal to include video data;

receive a second signal from a gyroscope at the first drone, the second signal to include gyroscope data associated with the video data; and communicate information to one or more other drones, via a fourth-generation long term evolution cellular radio telephone service, based on the video data and the gyroscope data associated with the video data to coordinate with the one or more drones to capture content related to a target.

12. The at least one non-transitory computer-readable medium of claim 11, wherein the information communicated to the one or more other drones comprises positional information.

13. The at least one non-transitory computer-readable medium of claim 11, comprising instructions that, in response to being executed by the processor circuit, cause the processor circuit to receive information from at least one of the one or more other drones.

14. The at least one non-transitory computer-readable medium of claim 13, wherein the information received from the at least one or more other drones comprises an indication of a flight plan.

15. The at least one non-transitory computer-readable medium of claim 13, wherein the information received from the at least one or more other drones comprises an indication of a position of the at least one drone in relation to the target.

16. The at least one non-transitory computer-readable medium of claim 13, wherein the information received from the at least one or more other drones comprises an aspect of the target to capture content related to.

17. The at least one non-transitory computer-readable medium of claim 16, wherein the target comprises an event and the aspect of the target to capture content related to comprises a participant in the event.

18. A system, comprising:

a first drone comprising a camera, a sensor array including a gyroscope, a first processor, and a first memory comprising instructions that when executed by the first processor cause the first processor to:

receive a first signal from the camera, the first signal to include video data, receive a second signal from the gyroscope, the second signal to include gyroscope data associated with the video data, and communicate information, via a fourth-generation long term evolution cellular radio telephone service, based on the video data and the gyroscope data associated with the video data; and a second drone comprising a second processor and a second memory comprising instructions that when executed by the second processor cause the second processor to:

receive the information communicated from the first drone, and coordinate capture of information related to a target based on the information communicated from the first drone.

19. The system of claim 18, wherein the information received from the first drone comprises positional information of the first drone.

20. The system of claim 19, wherein the positional information of the first drone comprises an indication of a position of the first drone in relation to the target.

21. The system of claim 18, wherein the information communicated by the first drone and received by the second drone is communicated via a fourth-generation long term evolution cellular radio telephone service.

22. The system of claim 21, wherein the information is received from the first drone via the fourth-generation long term evolution cellular radio telephone service.

23. The system of claim 18, wherein the information received from the first drone comprises an aspect of the target to capture content related to.

24. The system of claim 23, wherein the target comprises an event and the aspect of the target to capture content related to comprises a participant in the event.

* * * * *